United States Patent
Yamazaki et al.

(10) Patent No.: US 7,013,872 B2
(45) Date of Patent: Mar. 21, 2006

(54) FUEL INJECTOR FOR INTERNAL COMBUSTION ENGINE

(75) Inventors: Daichi Yamazaki, Toyota (JP); Naoki Kurata, Aichi-ken (JP); Mitsuto Sakai, Toyota (JP); Tatsuhiko Akita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/981,510

(22) Filed: Nov. 5, 2004

(65) Prior Publication Data

US 2005/0098155 A1    May 12, 2005

(30) Foreign Application Priority Data

Nov. 11, 2003    (JP)    ............................. 2003-381535

(51) Int. Cl.
*F02B 7/00*    (2006.01)

(52) U.S. Cl. ...................................... 123/431; 123/510

(58) Field of Classification Search ................ 123/431, 123/510, 299, 300, 446

See application file for complete search history.

(56) References Cited

U.S. PATENT DOCUMENTS

| 4,080,949 | A | | 3/1978 | Brinkman |
| 5,875,743 | A | * | 3/1999 | Dickey ..................... 123/25 C |
| 6,314,940 | B1 | * | 11/2001 | Frey et al. .................. 123/431 |
| 6,679,224 | B1 | * | 1/2004 | Stanglmaier ................ 123/431 |
| 6,799,558 | B1 | * | 10/2004 | Gmelin et al. .............. 123/431 |

FOREIGN PATENT DOCUMENTS

| EP | 1 085 203 A2 | 3/2001 |
| JP | 07-103048 | 4/1995 |
| JP | 07 103050 | 4/1995 |
| JP | 11 270385 | 10/1999 |
| JP | 2000-274329 | 10/2000 |

* cited by examiner

*Primary Examiner*—Mahmoud Gimie
(74) *Attorney, Agent, or Firm*—Kenyon & Kenyon LLP

(57) ABSTRACT

A fuel injector for an internal combustion engine including an in-cylinder fuel injection valve and an intake port fuel injection valve. An ECU controls an electromagnetic valve to keep a fuel inlet of a high pressure pump closed during an intake port injection mode during which fuel is injected only from an intake port fuel injection valve. As a result, even if the plunger reciprocates in the high pressure pump, fuel does not flow between the high pressure pump and a low pressure fuel path. Thus, pressure pulsation that would be caused by the operation of the high pressure pump does not occur in low pressure fuel.

21 Claims, 15 Drawing Sheets

FUEL INJECTOR FOR INTERNAL COMBUSTION ENGINE

CROSS-REFERENCE TO RELATED APPLICATIONS

This application is based upon and claims the benefit of priority from prior Japanese Patent Application No. 2003-381535, filed on Nov. 11, 2003, the entire contents of which are incorporated herein by reference.

BACKGROUND OF THE INVENTION

The present invention relates to a fuel injector for an internal combustion engine that is provided with an in-cylinder fuel injection valve and an intake port fuel injection valve.

A fuel injector including an in-cylinder fuel injection valve, which directly injects fuel into a combustion chamber, and an intake port fuel injection valve, which injects fuel into an intake port, is known in the prior art. The fuel injector is switched between an in-cylinder injection mode and an intake port injection mode in accordance with driving conditions (refer to Japanese Laid-Open Patent Publication No. 7-103048).

The in-cylinder fuel injection valve injects high pressure fuel supplied from a high pressure pump. The high pressure pump pressurizes fuel with a plunger, which is reciprocated in cooperation with the rotational motion produced by the engine, to supply the high pressure fuel to the in-cylinder fuel injection valve. When intake port injection is performed, in-cylinder injection is stopped. However, the plunger continues to reciprocate in cooperation with the rotational motion produced by the engine. In this case, the reciprocation of the plunger repetitively draws low pressure fuel in and out of the high pressure pump.

The pressure of the low pressure fuel in a low pressure fuel pipe pulsates when the low pressure fuel is repetitively drawn in and out of the high pressure pump. The pulsation of the fuel pressure leads to differences in the amount of fuel injected into each cylinder. More specifically, in a cylinder in which fuel is injected into the corresponding intake port at a timing when the fuel pressure becomes high due to pulsation, compared to a cylinder in which fuel is injected into the corresponding intake port at a timing when the fuel pressure becomes low, a relatively large amount of fuel is injected into the intake port even if the fuel injection time length is the same.

SUMMARY OF THE INVENTION

It is an object of the present invention to provide a fuel injector, which includes an in-cylinder fuel injection valve and an intake port fuel injection valve, for preventing the amount of fuel injected into the intake port from differing between cylinders.

One aspect of the present invention is a fuel injector for an internal combustion engine including a cylinder and an intake port communicated with the cylinder. The fuel injector includes an intake port fuel injection valve for injecting fuel into the intake port. An in-cylinder fuel injection valve directly injects fuel into a combustion chamber of the cylinder. A low pressure fuel path supplies the intake port fuel injection valve with fuel having relatively low pressure. A pump pressurizes the fuel having relatively low pressure to supply the in-cylinder fuel injection valve with fuel having relatively high pressure. A controller controls the intake port fuel injection valve and the in-cylinder fuel injection valve in accordance with an operating condition of the internal combustion engine. The controller includes a flow restricting means for restricting fuel flow between the pump and the low pressure fuel path during an intake port injection mode in which only the intake port fuel injection valve injects fuel.

Another aspect of the present invention is a fuel injector for an internal combustion engine including a cylinder and an intake port communicated with the cylinder. The fuel injector includes an intake port fuel injection valve for injecting fuel into the intake port, an in-cylinder fuel injection valve for directly injecting fuel into a combustion chamber of the cylinder, a low pressure fuel path for supplying the intake port fuel injection valve with fuel having relatively low pressure, a pump for pressurizing the fuel having relatively low pressure to supply the in-cylinder fuel injection valve with fuel having relatively high pressure, and a controller for controlling the intake port fuel injection valve and the in-cylinder fuel injection valve in accordance with an operating condition of the internal combustion engine. The controller executes a flow restricting process for restricting fuel flow between the pump and the low pressure fuel path during an intake port injection mode in which only the intake port fuel injection valve injects fuel.

A further aspect of the present invention is a method for supplying fuel to an internal combustion engine. The internal combustion engine includes a cylinder, an intake port communicated with the cylinder, and a fuel injector. The fuel injector includes an intake port fuel injection valve for injecting fuel into the intake port, an in-cylinder fuel injection valve for directly injecting fuel into a combustion chamber of the cylinder. A low pressure fuel path supplies the intake port fuel injection valve with fuel having relatively low pressure. A pump pressurizes the fuel having relatively low pressure to supply the in-cylinder fuel injection valve with fuel having relatively high pressure. The method includes injecting fuel from at least one of the intake port fuel injection valve and the in-cylinder fuel injection valve, and restricting fuel flow between the pump and the low pressure fuel path when only the intake port fuel injection valve injects fuel.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
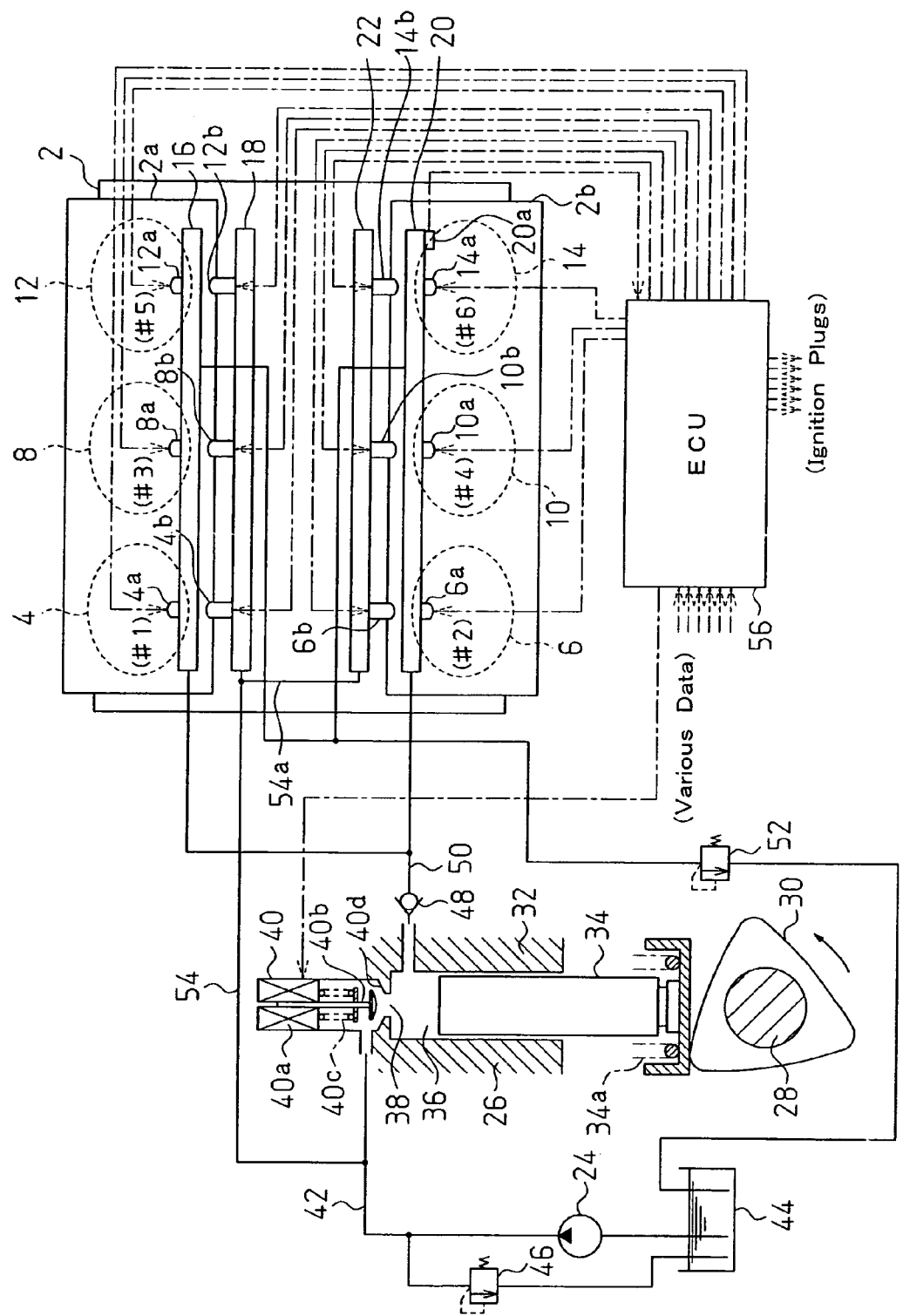
FIG. 1 is a schematic diagram showing an engine and a fuel supply system according to a first embodiment of the present invention.

FIG. 1 is a schematic diagram of an internal combustion engine and a fuel supply system to which a fuel injector according to a first embodiment of the present invention is applied. The internal combustion engine is a V-type six cylinder gasoline engine 2 including two banks 2a and 2b. The first bank 2a includes a first cylinder 4, a third cylinder 8, and a fifth cylinder 12. The second bank 2b includes a second cylinder 6, a fourth cylinder 10, and a sixth cylinder 14.

The cylinders 4, 8, and 12 of the first bank 2a are respectively provided with in-cylinder fuel injection valves 4a, 8a, and 12a. The in-cylinder fuel injection valves 4a, 8a, and 12a are each supplied with high pressure fuel from a high pressure fuel distribution pipe 16 to directly inject fuel into a corresponding combustion chamber. The cylinders 4, 8, and 12 are communicated with intake ports in which intake port fuel injection valves 4b, 8b, and 12b are arranged, respectively. The intake port fuel injection valves 4b, 8b, and 12b are each supplied with low pressure fuel from a low pressure fuel distribution pipe 18 to inject fuel into the corresponding intake port.

The cylinders 6, 10, and 14 of the second bank 2b are respectively provided with in-cylinder fuel injection valves 6a, 10a, and 14a. The in-cylinder fuel injection valves 6a, 10a, and 14a are each supplied with high pressure fuel from a high pressure fuel distribution pipe 20 to directly inject fuel into a corresponding combustion chamber. The cylinders 6, 10, and 14 have intake ports in which intake port fuel injection valves 6b, 10b, and 14b are arranged, respectively. The intake port fuel injection valves 6b, 10b, and 14b are each supplied with low pressure fuel from a low pressure fuel distribution pipe 22 to inject fuel into the corresponding intake port.

Fuel is supplied to the distribution pipes 16, 18, 20, and 22 from a fuel tank 44 by a feed pump 24 (low pressure pump) and a pressurizing pump 26 (high pressure pump). The feed pump 24 draws in fuel from the fuel tank 44 and forcibly sends out the low pressure fuel. The high pressure pump 26 pressurizes the low pressure fuel and forcibly sends out the high pressure fuel.

The high pressure pump 26 includes a triangular pump cam 30, which is attached to an intake camshaft 28 of the engine 2, a cylinder 32, and a plunger 34, which functions as a pressurizing member that reciprocates in the cylinder 32. Further, the high pressure pump 26 includes a pressurizing chamber 36, which is defined by the cylinder 32 and the plunger 34, and an electromagnetic valve 40, which adjusts the amount of fuel having relatively low pressure that is drawn into the pressurizing chamber 36 through a fuel inlet 38.

During the intake stroke of the high pressure pump 26, low pressure fuel from the feed pump 24 is supplied to the pressurizing chamber 36 through a low pressure fuel path 42 and the fuel inlet 38. Some of the low pressure fuel is not drawn into the high pressure pump 26. Such fuel is returned to the fuel tank 44 through a relief valve 46. During the compression stroke of the high pressure pump 26, the fuel in the pressurizing chamber 36 is pressurized. The high pressure fuel opens a check valve 48 and enters a bifurcated high pressure fuel supply passage 50 to be supplied to the high pressure fuel distribution pipes 16 and 20. This supplies the high pressure fuel, which is injected into the combustion chambers of the engine 2, to the in-cylinder fuel injection valves 4a, 6a, 8a, 10a, 12a, and 14a. The surplus fuel that remains in the distribution pipes 16 and 20 without being injected is returned to the fuel tank 44 through a relief valve 52.

The low pressure fuel from the feed pump 24 is supplied to the low pressure fuel distribution pipes 18 and 22 through the low pressure fuel path 42 and a low pressure fuel supply passage 54. This supplies the low pressure fuel that is injected into the intake port of each cylinder to the intake port fuel injection valves 4b, 6b, 8b, 10b, 12b, and 14b. The low pressure fuel of the low pressure fuel supply passage 54 is supplied to the low pressure fuel distribution pipe 22 through a branch passage 54a that is branched from the low pressure fuel supply passage 54.

An electronic control unit (ECU) 56 controls the opening and closing of the electromagnetic valve 40 and adjusts the amount of the low pressure fuel that is pressurized by the high pressure pump 26. The ECU 56 is an electronic circuit configured about a digital computer. The ECU 56 is provided with various data signals from various types of sensors and switches, such as a fuel pressure sensor 20a for detecting the fuel pressure in the high pressure fuel distribution pipe 20, an engine speed sensor, a cam position sensor, and an air-fuel ratio sensor. Based on these detection signals, the ECU 56 calculates the timing for exciting and de-exciting the electromagnetic valve 40 to control the electromagnetic valve 40. Further, the ECU 56 executes engine control, such as fuel injection control and ignition timing control. In this embodiment, fuel is injected into the intake ports corresponding to the intake port fuel injection valves 4b to 14b when the engine speed and load are low. Fuel is injected into the combustion chambers corresponding to the in-cylinder fuel injection valves 4a to 14a when the engine speed or load is high.

The electromagnetic valve 40 is a normally closed valve. That is, when an excitation coil 40a of the electromagnetic valve 40 is de-excited, the urging force of a spring 40c moves a valve body 40b toward the pressurizing chamber 36 until it is engaged with a seat 40d. This closes the electromagnetic valve 40. When the excitation coil 40a is excited, the valve body 40b moves away from the seat 40d in a direction opposite to the pressurizing chamber 36 against the urging force of the spring 40c. This opens the electromagnetic valve 40.

Figure 2:
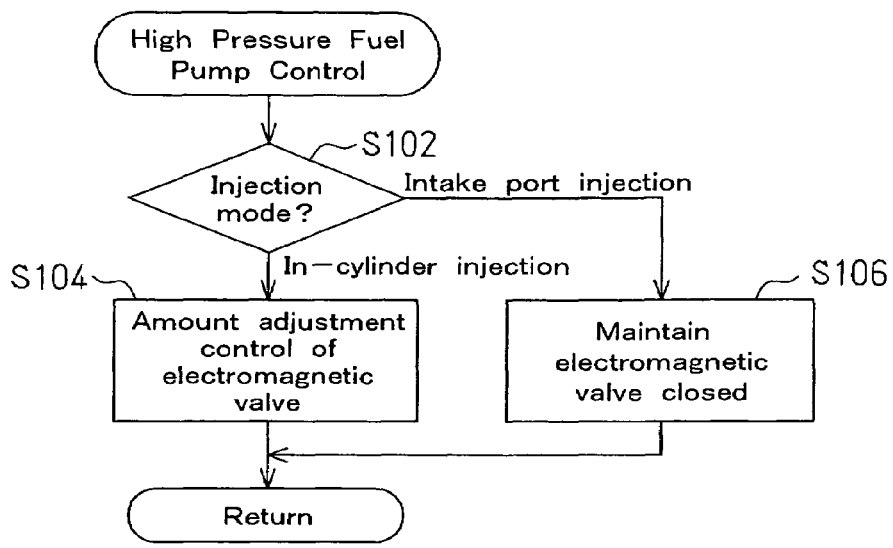
FIG. 2 is a flowchart illustrating high pressure pump control.
Figure 3:
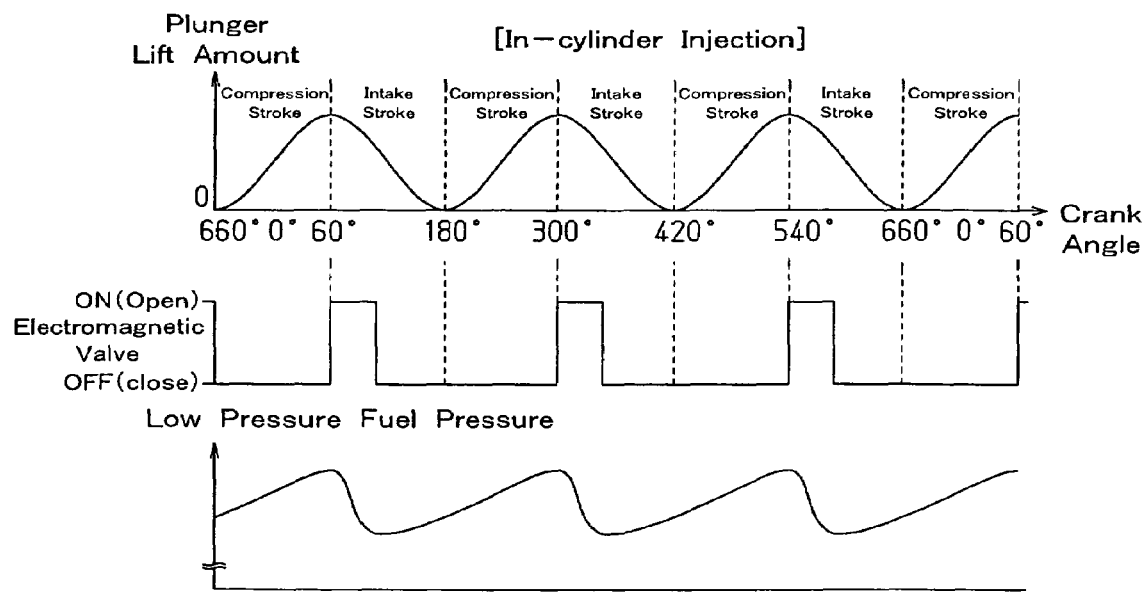
FIG. 3 is a timing chart illustrating an example of control during in-cylinder injection.

High pressure pump control will now be discussed with reference to FIG. 2. The control of FIG. 2 is repetitively executed in predetermined cycles. When the control is started, the ECU 56 first checks the present injection mode (S102). When the injection mode is "in-cylinder injection," the ECU 56 executes amount adjustment control of the electromagnetic valve 40 in the high pressure pump 26 (S104, refer to FIG. 3).

More specifically, rotation of the pump cam 30 lowers the plunger 34 with the urging force of a spring 34a and decreases the lift amount. In this state, the volume of the pressurizing chamber 36 is increased in the intake stroke. Further, the excitation coil 40a is excited (ON) to open the electromagnetic valve 40. As a result, the low pressure fuel in the low pressure fuel path 42 is drawn into the pressurizing chamber 36. During the intake stroke, the excitation coil 40a is de-excited (OFF) to close the electromagnetic valve 40. This closes the fuel inlet 38 and stops the flow of low pressure fuel into the pressurizing chamber 36. Subsequently, the expanded pressurizing chamber 36 becomes filled with fuel vapor.

Further rotation of the pump cam 30 lifts the plunger 34 against the urging force of the spring 34a and starts to increase the lift amount of the plunger 34. In this state, the volume of the pressurizing chamber 36 decreases as the fuel vapor in the pressurizing chamber 36 becomes eliminated in the compression stroke. When the fuel vapor in the pressurizing chamber 36 becomes eliminated, the plunger 34 compresses the fuel, which was drawn into the pressurizing chamber 36, to produce high pressure fuel. The high pressure fuel opens the check valve 48 and flows into the high pressure fuel distribution pipes 16 and 20 through the high pressure fuel supply passage 50.

The high pressure pump 26, which repeats the intake stroke and the compression stroke, adjusts the amount of low pressure fuel by controlling the excited time of the excitation coil 40a during the intake stroke. High pressure fuel is produced from the low pressure fuel, of which amount has been adjusted, and then forcibly delivered to the high pressure fuel supply passage 50. The ECU 56 adjusts the exciting period of the excitation coil 40a so that the fuel pressure detected by the fuel pressure sensor 20a matches a target fuel pressure, which is obtained from a map in accordance with the operating condition of the engine 2.

Figure 4:
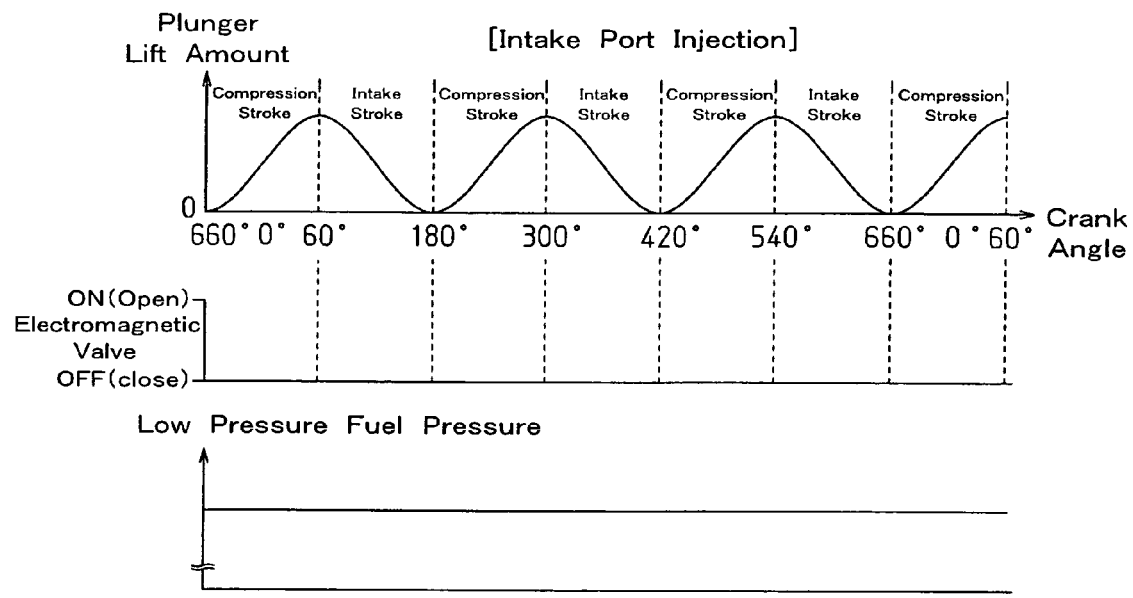
FIG. 4 is a timing chart illustrating an example of control during an intake port injection mode.

In step S102, if the injection mode is "intake port injection," the ECU 56 maintains the electromagnetic valve 40 in the closed state (S106). That is, as shown in FIG. 4, the electromagnetic valve 40 remains in the de-excited state, and the fuel inlet 38 is maintained in the closed state. Thus, fuel does not flow between the low pressure fuel path 42 and the pressurizing chamber 36. Further, fuel pressure pulsation does not occur in the low pressure fuel path 42 even if the plunger 34 reciprocates in the cylinder 32 and changes the volume of the pressurizing chamber 36.

Steps S102 and S106 of the high pressure pump control (FIG. 2) may also be referred to as a flow restricting process, and thus the ECU 56 includes a flow restricting means.

The first embodiment has the advantages described below.

(1) In the intake port injection mode, the electromagnetic valve 40 remains de-excited to keep the fuel inlet 38 of the high pressure pump 26 closed. Thus, even if the plunger 34 is reciprocated in the high pressure pump 26, the flow of fuel between the high pressure pump 26 and the low pressure fuel path 42 is restricted. In this embodiment, fuel flow is completely stopped. Since the operation of the high pressure pump 26 does not result in pressure pulsation of the low pressure fuel, the amount of fuel injected from the intake port during the intake port injection mode is prevented from differing between the cylinders 4 to 14.

(2) The electromagnetic valve 40, which is normally closed, remains closed in the de-excited state. Thus, electric energy is not needed when the process for preventing low pressure fuel pressure pulsation is performed. This is advantageous from the aspect of fuel efficiency.

A second embodiment of the present invention will now be discussed.

Figure 5:
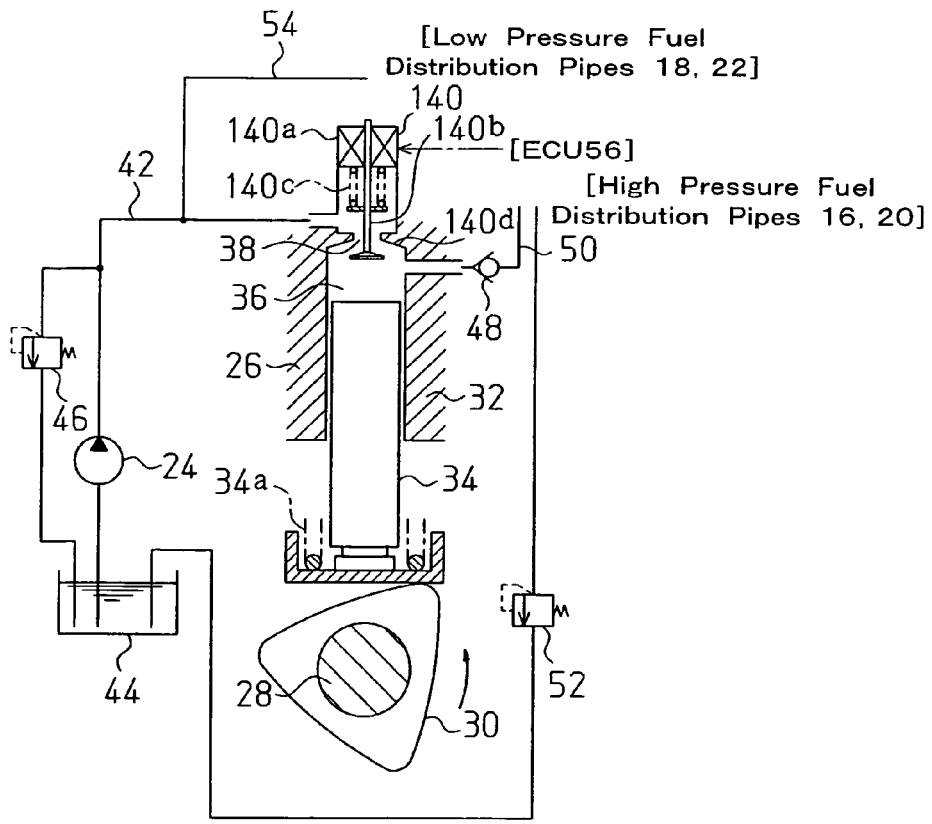
FIG. 5 is a schematic diagram of a fuel supply system according to a second embodiment of the present invention.

Referring to FIG. 5, this embodiment differs from the first embodiment in the high pressure pump control and an electromagnetic valve 140, which adjusts the amount of the relatively low pressure fuel drawn into the high pressure pump 26. The other parts are the same as the first embodiment. Like or same reference numerals are given to those components that are the same as the corresponding components of the first embodiment.

When an excitation coil 140a of the electromagnetic valve 140 is excited, the urging force of a spring 140c moves a valve body 140b in a direction opposite to the pressurizing chamber 36 against the urging force of the spring 140c until the valve body 140b is engaged with a seat 140d. This closes the electromagnetic valve 140. When the excitation coil 40a is de-excited, the urging force of the spring 140c moves the valve body 140b away from the seat 140d toward the pressurizing chamber 36. This opens the electromagnetic valve 40. In this manner, the electromagnetic valve 40 is a normally open valve.

In the high pressure pump control of this embodiment, when the injection mode is "in-cylinder injection" in step S102 of FIG. 2, amount adjustment control of the electromagnetic valve 140 in the high pressure pump 26 (S104) is performed. The amount adjustment control will now be discussed with reference to FIG. 6.

Rotation of the pump cam 30 lowers the plunger 34 with the urging force of the spring 34a and decreases the lift amount. In this state, the volume of the pressurizing chamber 36 is increased in the intake stroke. Further, the excitation coil 140a is de-excited (OFF) to open the electromagnetic valve 140. As a result, the low pressure fuel in the low pressure fuel path 42 is drawn into the pressurizing chamber 36.

Further rotation of the pump cam 30 lifts the plunger 34 against the urging force of the spring 34a and starts to increase the lift amount of the plunger 34. In this state, the volume of the pressurizing chamber 36 decreases as the fuel in the pressurizing chamber 36 returns to the low pressure fuel path 42 through the fuel inlet 38 in the compression stroke. During the compression stroke, the ECU 56 excites (ON) the excitation coil 140a and closes the fuel inlet 38. Since this closes the fuel inlet 38, further fuel does not return from the pressurizing chamber 36 to the low pressure fuel path 42. The plunger 34 then compresses the fuel in the pressurizing chamber 36 into high pressure fuel. The high pressure fuel opens the check valve 48 and flows into the high pressure fuel distribution pipes 16 and 20 through the high pressure fuel supply passage 50.

As the intake stroke and the compression stroke are repeated, the ECU 56 controls the excitation timing of the excitation coil 140a during the compression stroke to adjust the amount of high pressure fuel forcibly delivered to the high pressure fuel supply passage 50. The adjustment of the fuel amount is as described in the first embodiment.

Figure 7:
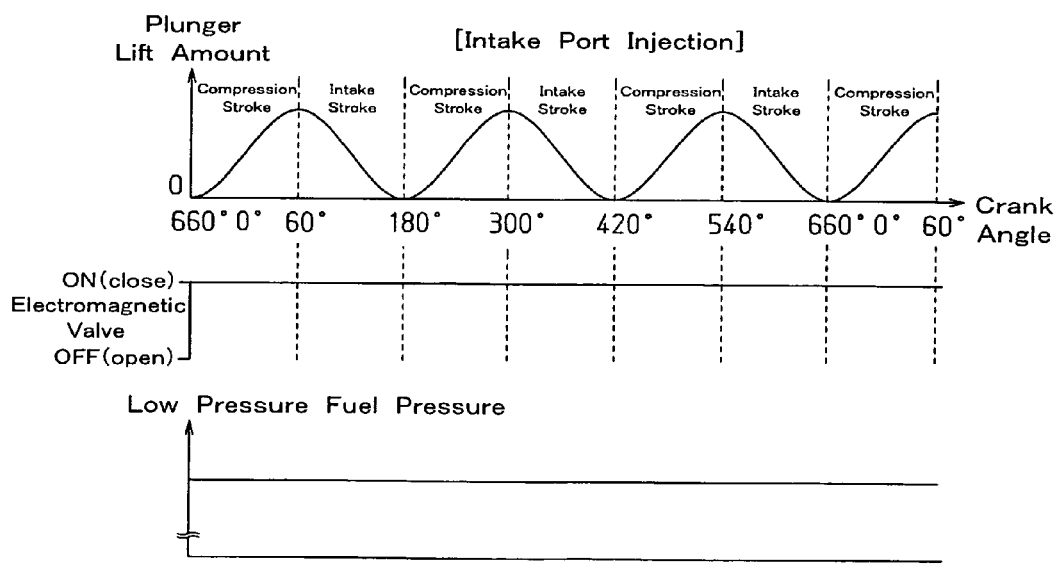
FIG. 7 is a timing chart illustrating an example of control during an intake port injection mode.

In step S102, if the injection mode is "intake port injection," the ECU 56 maintains the electromagnetic valve 40 in the closed state (S106). That is, as shown in FIG. 7, the electromagnetic valve 140 remains in the excited state, and the fuel inlet 38 is maintained in the closed state. Thus, fuel does not flow between the low pressure fuel path 42 and the pressurizing chamber 36 through the fuel inlet 38 in the intake port injection mode. Further, fuel pressure pulsation does not occur in the low pressure fuel path 42 even if the plunger 34 reciprocates in the cylinder 32.

Steps S102 and S106 of the high pressure pump control (FIG. 2) may also be referred to as a flow restricting process, and thus the ECU 56 includes a flow restricting means.

The second embodiment has the advantages described below.

(1) In the intake port injection mode, the electromagnetic valve 140 remains excited (FIG. 2, S106) to keep the fuel inlet 38 of the high pressure pump 26 closed. Thus, advantage (1) of the first embodiment is obtained.

A third embodiment of the present invention will now be discussed.

Figure 8:
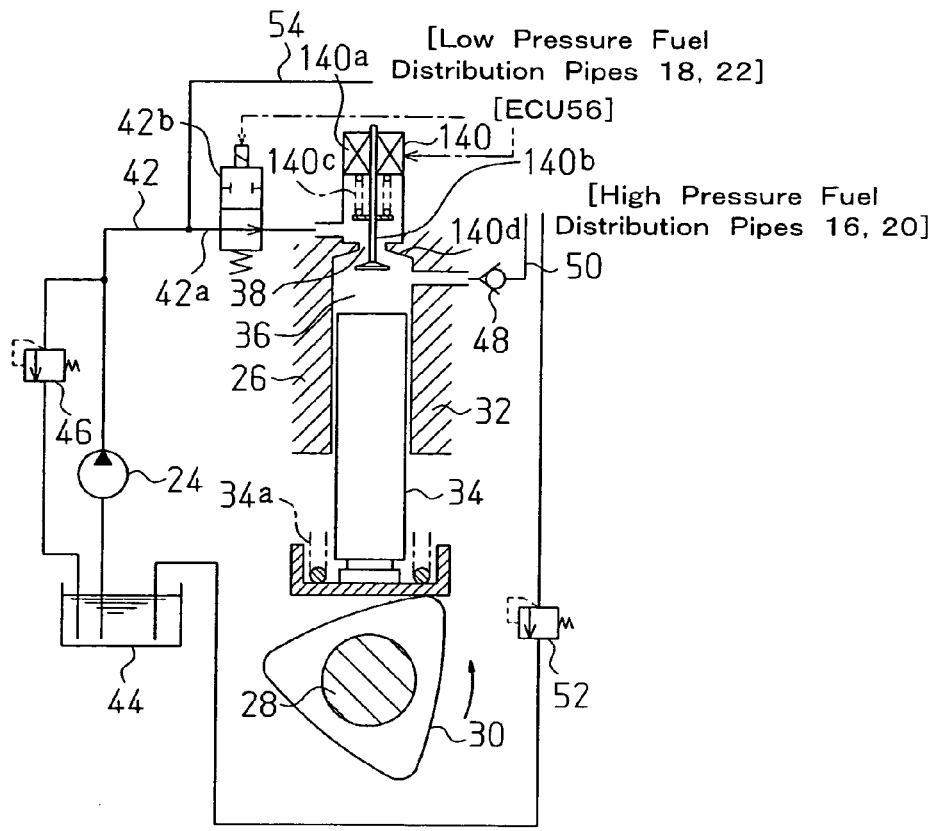
FIG. 8 is a schematic diagram of a fuel supply system according to a third embodiment of the present invention.
Figure 9:
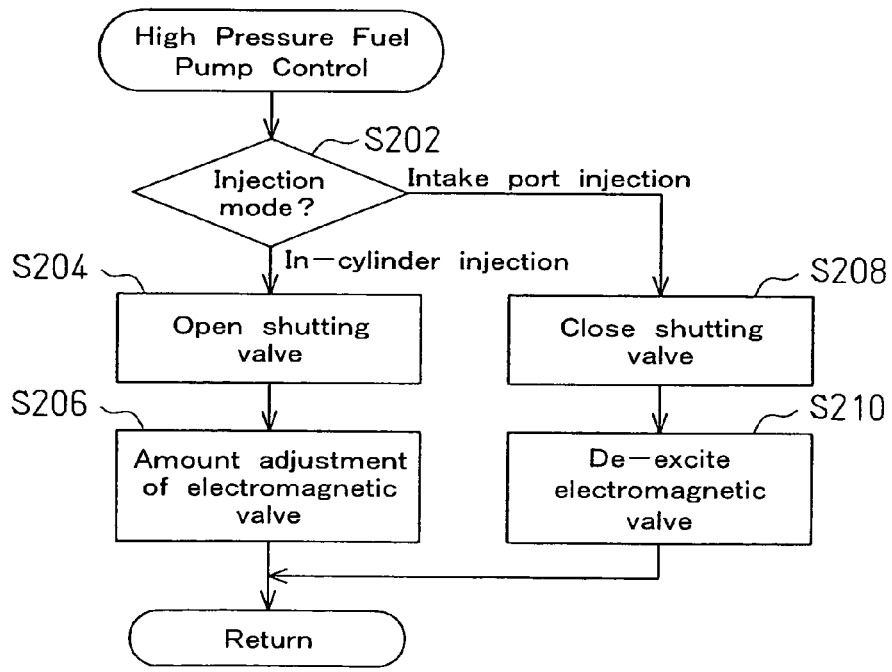
FIG. 9 is a flowchart illustrating high pressure pump control.

Referring to FIG. 8, in this embodiment, an electromagnetic shutting valve 42b is arranged in a low pressure fuel intake passage 42a, which is connected to the low pressure fuel path 42 and the high pressure pump 26. Further, instead of the high pressure pump control of FIG. 2, the high pressure pump control illustrated in FIG. 9 is executed. The other parts are the same as the second embodiment. Like or same reference numerals are given to those components that are the same as the corresponding components of the second embodiment.

The high pressure pump control (FIG. 9) will now be described. The control of FIG. 9 is repetitively executed in predetermined cycles. When the control is started, the present injection mode is first checked (S202).

Figure 6:
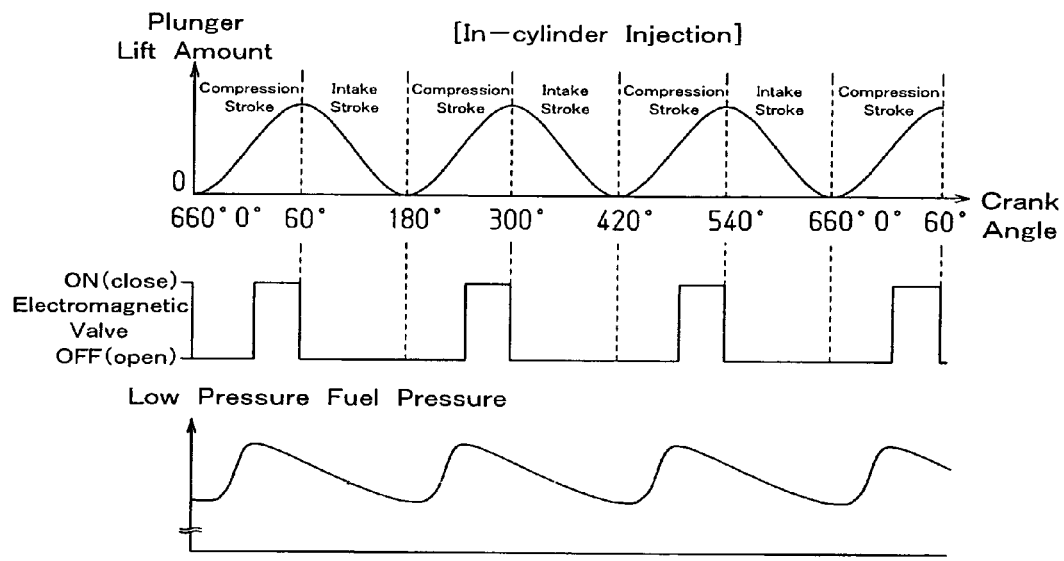
FIG. 6 is a timing chart illustrating an example of control during in-cylinder injection.
Figure 10:
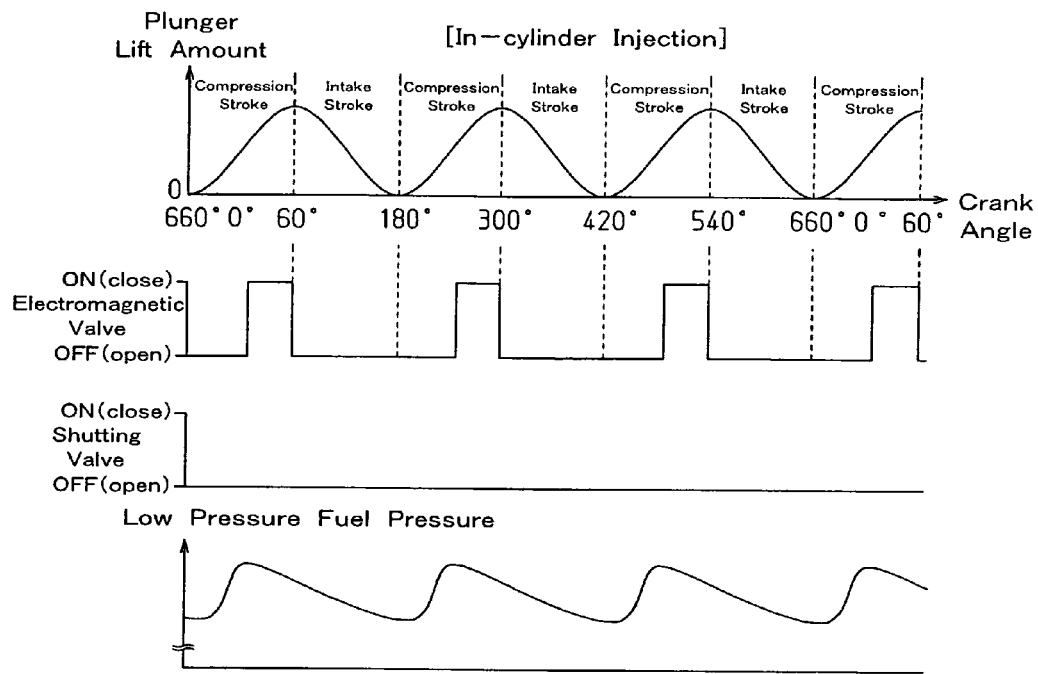
FIG. 10 is a timing chart illustrating an example of control during in-cylinder injection.

If the injection mode is "in-cylinder injection," the electromagnetic shutting valve is de-excited and opened (S204). Thus, the low pressure fuel intake passage 42a is not closed. The amount adjustment control of the electromagnetic valve 140 is executed for the high pressure pump 26 as shown in the graph of FIG. 10 (S202). As illustrated in FIG. 6, the amount adjustment control repeats the intake stroke and the compression stroke and controls the excitation timing of the excitation coil 140a during the compression stroke to adjust the amount of high pressure fuel forcibly delivered to the high pressure fuel supply passage 50.

Figure 11:
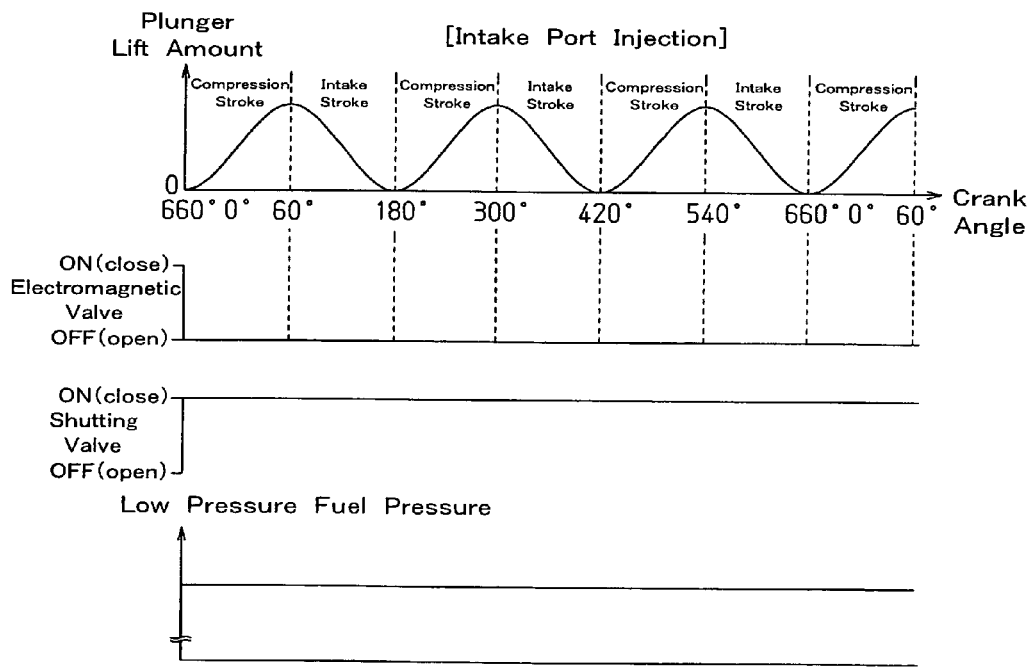
FIG. 11 is a timing chart illustrating an example of control during an intake port injection mode.

When it is determined that the injection mode is "intake port injection" in step S202, the electromagnetic shutting valve 42b is excited and closed (S208), and the electromagnetic valve 140 is de-excited and opened (S210). That is, as illustrated in FIG. 11, since the electromagnetic shutting valve 42b is closed, fuel does not flow between the low pressure fuel path 42 and the pressurizing chamber 36 even if the fuel inlet 38 is open. Further, fuel pressure pulsation does not occur in the low pressure fuel path 42 even if the plunger 34 reciprocates in the cylinder 32.

Steps S202 and S208 of the high pressure pump control (FIG. 9) may also be referred to as a shutting controlling process of the intake port injection mode, and thus the ECU 56 includes a means for controlling the shutting valve in the intake port injection mode.

The advantages of the third embodiment will now be described.

(1) In the intake port injection mode, the electromagnetic shutting valve 42b disconnects the high pressure pump 26 and the low pressure fuel path 42. This completely stops the flow of fuel between the high pressure pump 26 and the low pressure fuel path 42. Thus, low pressure fuel is not drawn into and out of the high pressure pump 26. This suppresses pressure pulsation of the low pressure fuel. As a result, in the intake port injection mode, the amount of fuel injected into the intake ports is prevented from differing between the cylinders 4 to 14.

A fourth embodiment of the present invention will now be discussed.

Figure 12:
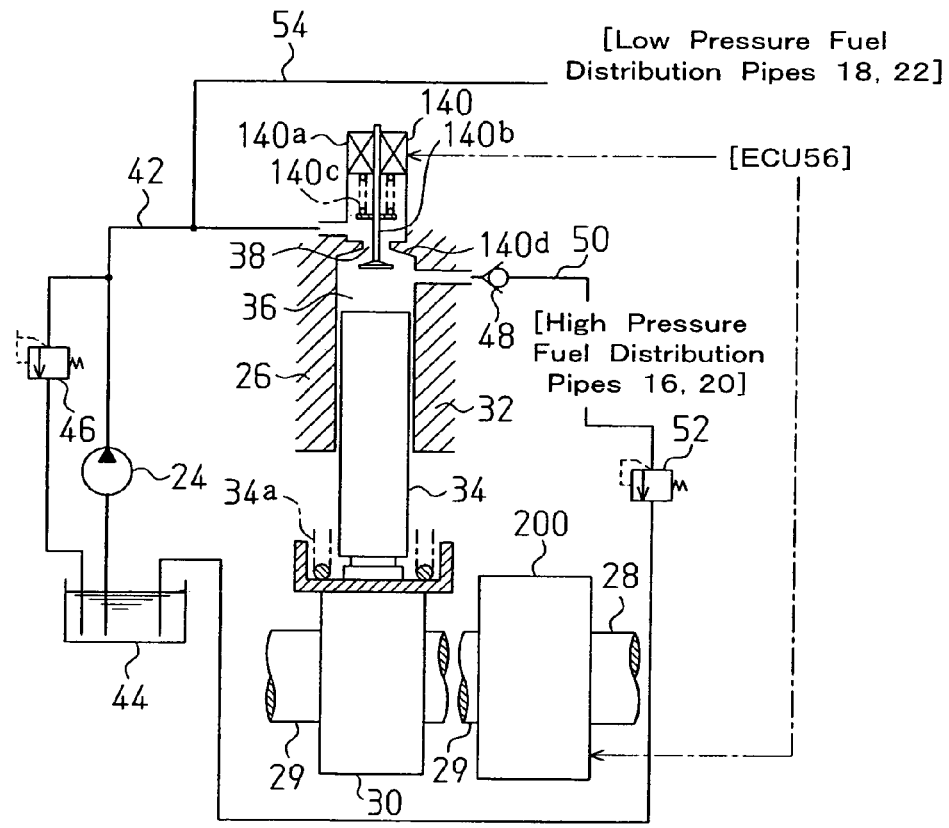
FIG. 12 is a schematic diagram of a fuel supply system according to a fourth embodiment of the present invention.
Figure 13:
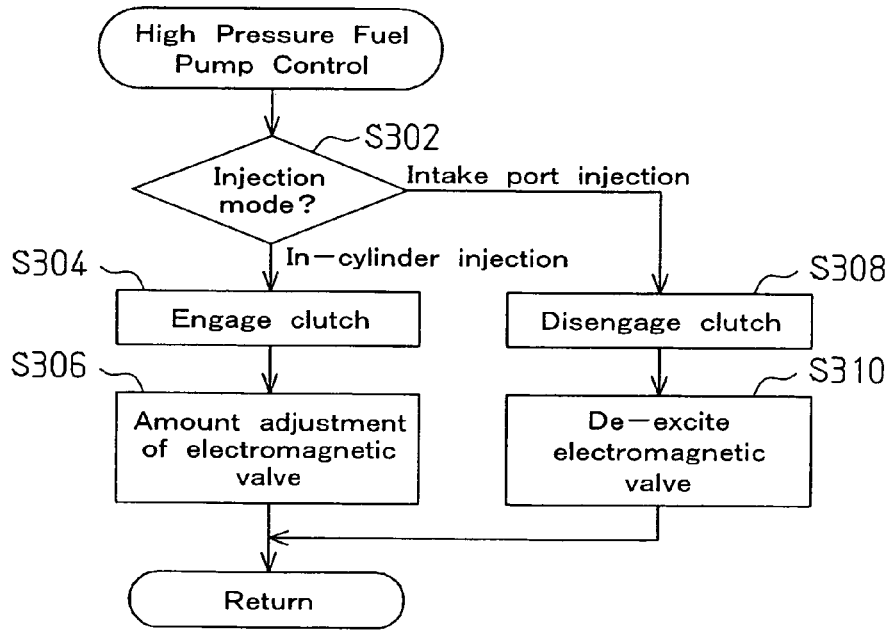
FIG. 13 is a flowchart illustrating high pressure pump control.

In this embodiment, referring to FIG. 12, an electromagnetic clutch 200 is arranged between the intake camshaft 28 and a pump camshaft 29 on which the pump cam 30 is arranged. Further, instead of the high pressure pump control of FIG. 2, the high pressure pump control of FIG. 13 is executed. The other parts are the same as the second embodiment. Like or same reference numerals are given to those components that are the same as the corresponding components of the second embodiment.

The electromagnetic clutch 200, which is controlled by the ECU 56, engages the intake camshaft 28 and the pump camshaft 29 when de-excited. In this state, the rotation of the intake camshaft 28 is transmitted to the pump camshaft 29. Thus, the pump cam 30 is rotated in cooperation with the rotation of the intake camshaft 28. Further, the electromagnetic clutch 200 disengages the intake camshaft 28 from the pump camshaft 29 when excited. In this state, the rotation of the intake camshaft 28 is not transmitted to the pump camshaft 29. This stops the rotation of the pump cam 30.

High pressure pump control (FIG. 13) will now be described. This control is repetitively performed at predetermined cycles. When the control is started, the present injection mode is checked (S302).

Figure 14:
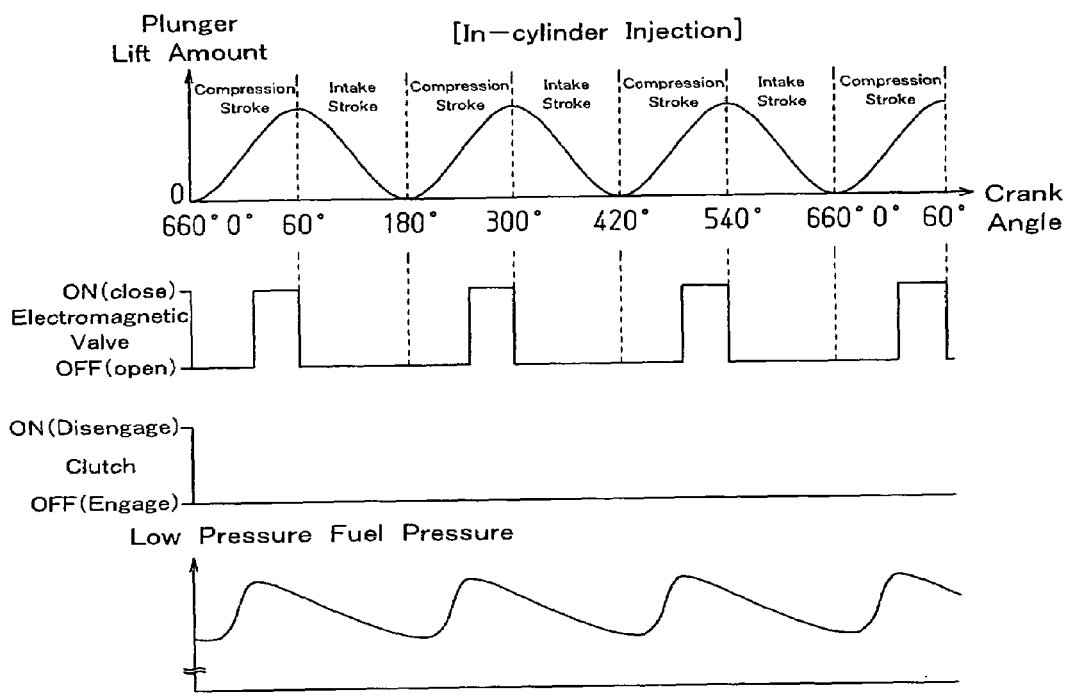
FIG. 14 is a timing chart illustrating an example of control during in-cylinder injection.

When the injection mode is "in-cylinder injection," the electromagnetic clutch 200 is first de-excited to enter the engagement state (S304). In this state, the pump cam 30 is rotated. Thus, the plunger 34 reciprocates and changes the volume of the pressurizing chamber 36. The amount adjustment control of the electromagnetic valve 140 is executed on the high pressure pump 26 as illustrated in the graph of FIG. 14 (S306). As a result, high pressure fuel, the amount of which is adjusted, is forcibly delivered to the high pressure fuel supply passage 50.

Figure 15:
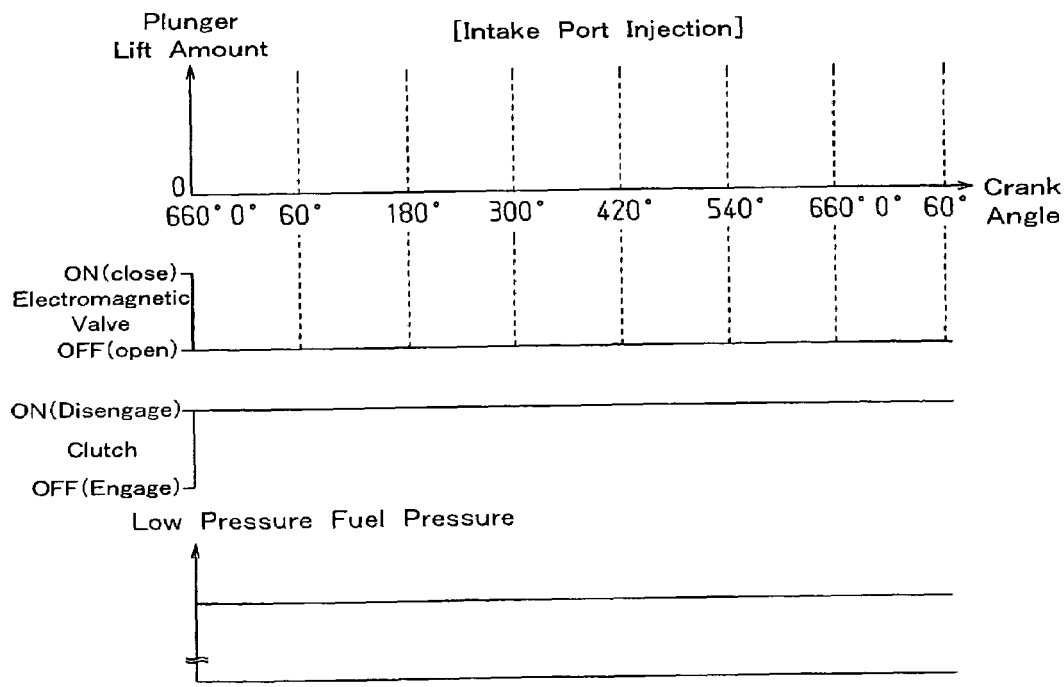
FIG. 15 is a timing chart illustrating an example of control during an intake port injection mode.

If the determination of step S302 is "intake port injection" in step S302, the electromagnetic clutch 200 is excited to enter the disengagement state (S308). Then, the electromagnetic valve 140 is de-excited and opened (S310). That is, as illustrated in FIG. 15, since the electromagnetic clutch 200 is in the disengagement state, the plunger 34 stops reciprocating, and the volume of the pressurizing chamber 36 does not change. Thus, even if the fuel inlet 38 is open, fuel does not flow between the low pressure fuel path 42 and the pressurizing chamber 36 in the intake port injection mode, and pressure pulsation of the fuel does not occur in the low pressure fuel path 42.

Steps S302 and S308 of the high pressure pump control (FIG. 13) may also be referred to as a flow restricting process, and thus the ECU 56 includes a flow restricting means.

The fourth embodiment has the advantage described below.

(1) When the pump cam 30 stops rotating, the plunger 34, which serves as a pressurizing member, stops reciprocating. This stops the flow of fuel between the high pressure pump 26 and the low pressure fuel path 42. Thus, pressure pulsation of the low pressure fuel is suppressed, and the amount of fuel injected from the intake ports in the intake port injection mode is prevented from differing between the cylinders 4 to 14.

A fifth embodiment of the present invention will now be described.

Figure 16:
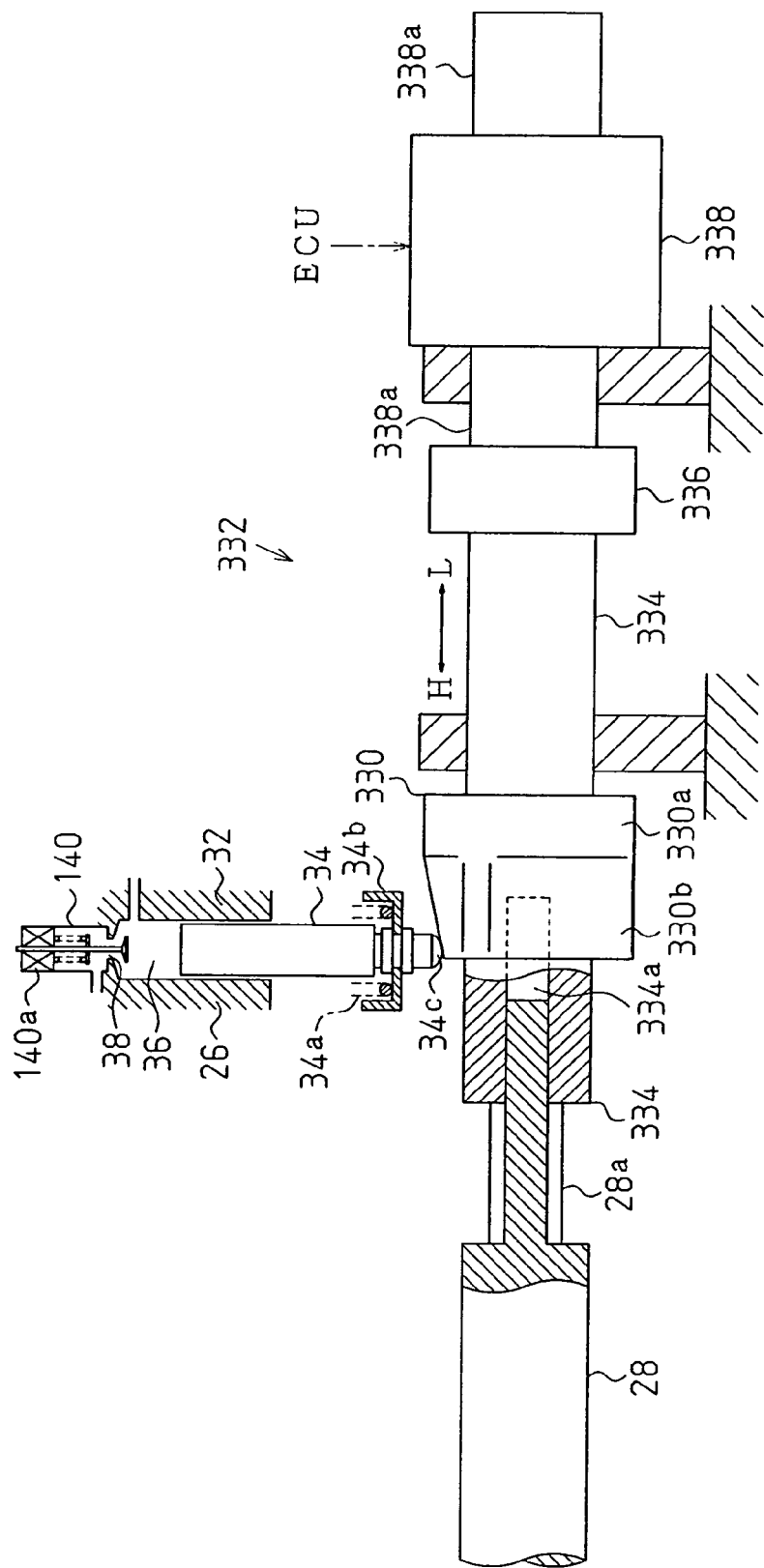
FIG. 16 is a partial cross-sectional view of a high pressure pump and a three-dimensional pump cam slide mechanism according to a fifth embodiment of the present invention.
Figure 17:
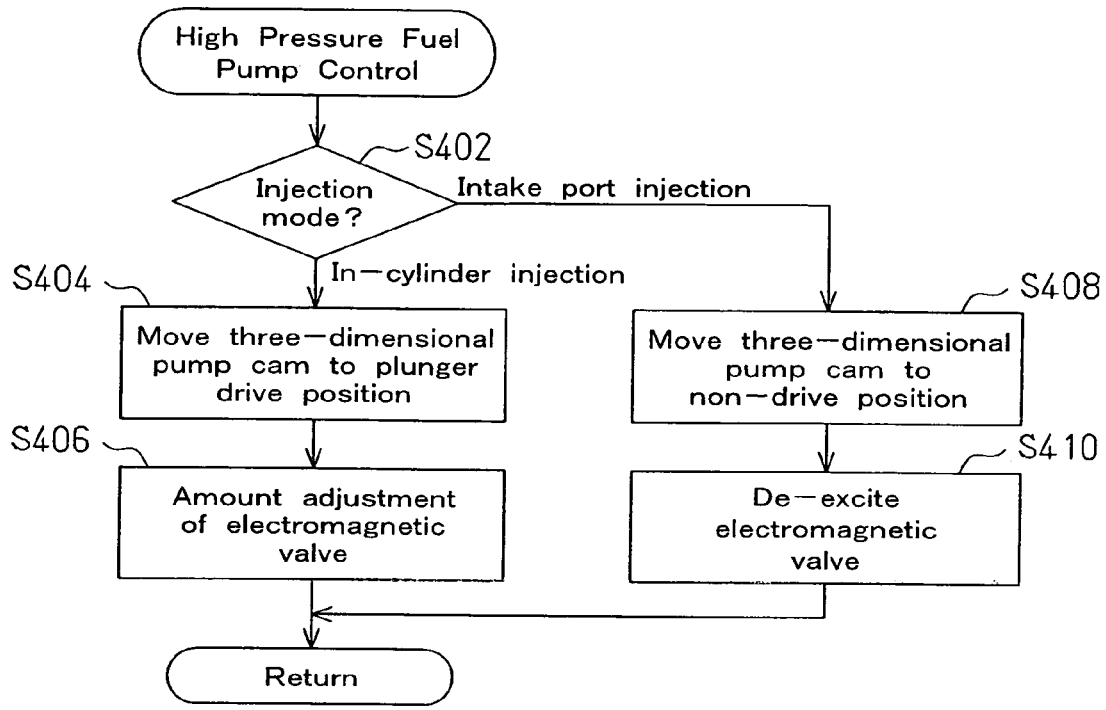
FIG. 17 is a flowchart illustrating high pressure pump control.

In this embodiment, a three-dimensional pump cam 330 is used as shown in FIG. 16. A slide mechanism 332 enables axial movement of the three-dimensional pump cam 330. Further, the plunger 34 of the high pressure pump 26 extends through a lifter 34b toward the three-dimensional pump cam 330. A ball 34c is defined on the distal end of the plunger 34. The urging force of a spring 34a presses the ball 34c against a cam surface defined on the three-dimensional pump cam 330. The rotation of the three-dimensional pump cam 330 reciprocates the plunger 34. Further, instead of the high pressure pump control of FIG. 2, the high pressure pump control of FIG. 17 is executed. The other parts are the same as the second embodiment. Like or same reference numerals are given to those components that are the same as the corresponding components of the second embodiment.

The slide mechanism 332 includes a pump camshaft 334 to which the three-dimensional pump cam 330 is attached, a bearing 336 rotatably supporting the pump camshaft 334, and an actuator 338 for axially moving the bearing 336 with a drive shaft 338a. The actuator 338, which is a hydraulic cylinder or an electric motor, axially moves the drive shaft 338a to alter the axial position of the three-dimensional pump cam 330.

A straight spline portion 28a extends from the distal end of the intake camshaft 28. The straight spline portion 28a is inserted in a spline engagement hole 334a, which is formed in the center of the pump camshaft 334. Accordingly, the intake camshaft 28 and the pump camshaft 334 are movable relative to each other in the axial direction but do not rotate relative to each other about their axes.

Figure 18:
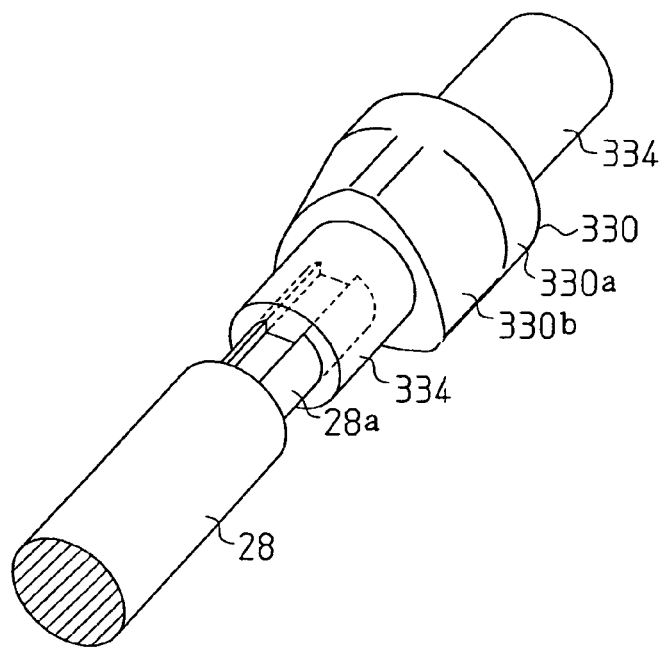
FIG. 18 is a partial perspective view showing a three-dimensional pump cam.
Figure 19A:
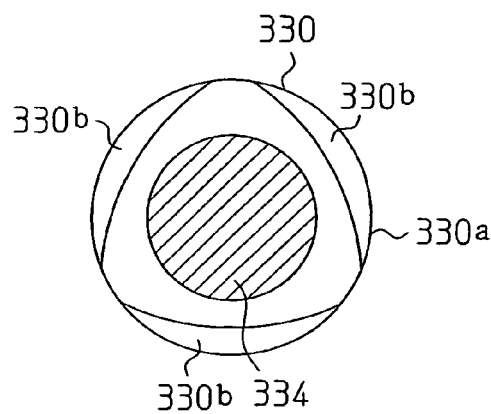
FIGS. 19A and 19B are cross-sectional views of the three-dimensional pump cam.
Figure 19B:
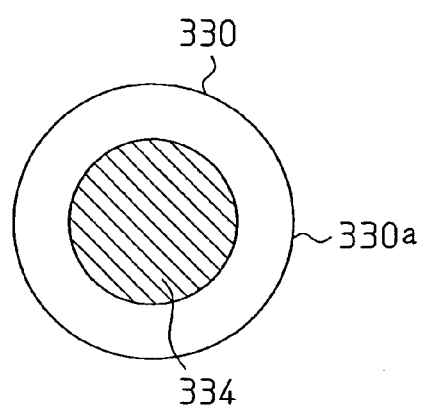

Referring to FIGS. 18A, 19A, and 19B, the cam surface of the three-dimensional pump cam 330 is divided into two regions in the axial direction. A non-drive region 330a is defined in the area farther from the intake camshaft 28. The cam surface is cylindrical at the non-drive region 330a. A drive region 330b is defined in the area of the cam surface closer to the intake camshaft 28. The cam surface is cylindrical at the portion that is continuous with the non-drive region 330a but gradually becomes generally triangular toward the intake camshaft 28. FIG. 18 is a partial perspective view showing the slide mechanism 332, FIG. 19A is a left side view showing the three-dimensional pump cam 330, and FIG. 19B is a right side view showing the three-dimensional pump cam 330.

Figure 20:
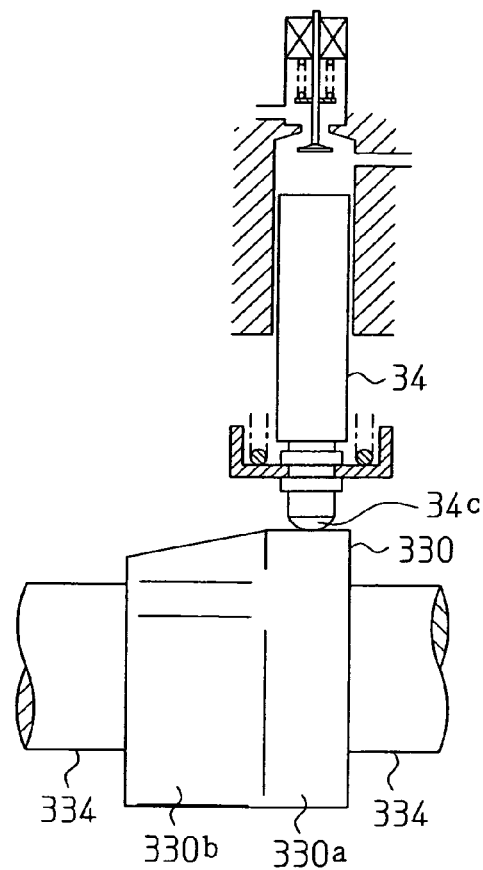
FIG. 20 is a schematic diagram illustrating movement of the three-dimensional pump cam with the three-dimensional pump cam slide mechanism in the intake port injection mode.

The ECU 56 controls the actuator 338 to move the drive shaft 338a in direction L so that the ball 34c on the distal end of the plunger 34 contacts the drive region 330b, as shown in the state of FIG. 16. This reciprocates the plunger 34 as the intake camshaft 28 rotates and changes the volume of the pressurizing chamber 36. Conversely, by moving the drive shaft 338a in direction H, the ball 34c contacts the non-drive region 330a, as shown in the state of FIG. 20. Thus, the plunger 34 does not reciprocate even if the intake camshaft 28 is rotated. In such a state, the lift amount does not change, and the volume of the pressurizing chamber 36 remains constant.

The high pressure pump control (FIG. 17) will now be described. This control is repetitively executed at predetermined cycles. When the control is started, the present injection mode is checked (S402).

Figure 21:
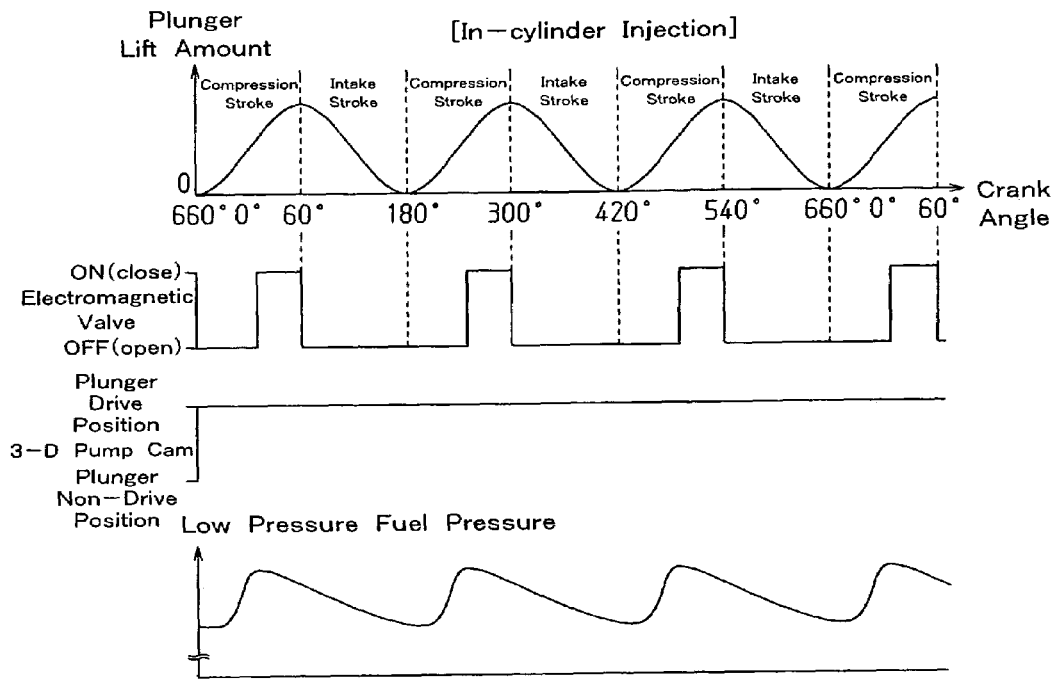
FIG. 21 is a timing chart illustrating an example of control during in-cylinder injection.

When the injection mode is "in-cylinder injection," the actuator 338 moves the three-dimensional pump cam 330 to a plunger drive position, as shown in the state of FIG. 16 (S304). In this state, rotation of the pump cam 30 reciprocates the plunger 34 and changes the volume of the pressurizing chamber 36. The amount adjustment control of the electromagnetic valve 140 is executed on the high pressure pump 26 as illustrated in the graph of FIG. 21 (S406). As a result, high pressure fuel, the amount of which is adjusted, is forcibly delivered to the high pressure fuel supply passage 50.

Figure 22:
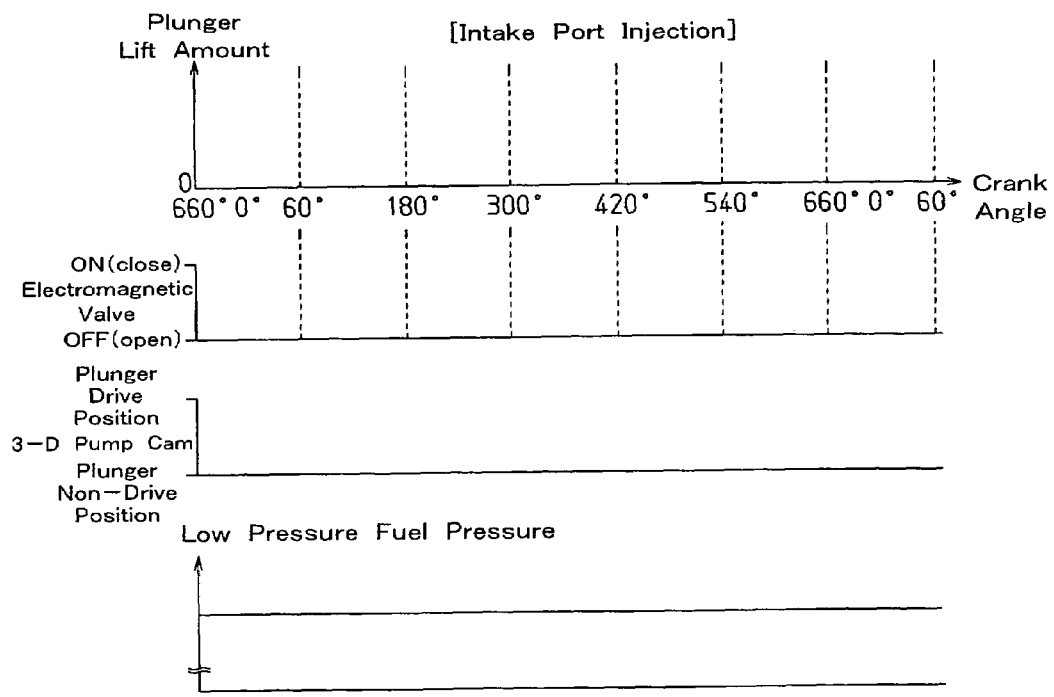
FIG. 22 is a timing chart illustrating control during an intake port injection mode.

If the determination of the injection mode is "intake port injection" in step S402, the actuator 338 moves the three-dimensional pump cam 330 to a plunger non-drive position, as shown in the state of FIG. 20 (S408). Then, the electromagnetic valve 140 is de-excited and opened (S410). More specifically, as illustrated in FIG. 22, the plunger 34 does not reciprocate, and the volume of the pressurizing chamber 36 does not change. Thus, even if the fuel inlet 38 is open, fuel does not flow between the low pressure fuel path 42 and the pressurizing chamber 36 in the intake port injection mode, and pressure pulsation of the fuel does not occur in the low pressure fuel path 42.

Steps S402 and S408 of the high pressure pump control (FIG. 17) may also be referred to as a flow restricting process, and thus the ECU 56 includes a flow restricting means.

The fifth embodiment has the advantage described below.

(1) When the three-dimensional pump cam 330 moves axially in the intake port injection mode, the ball 34c contacts the non-drive region 330a. This stops the reciprocation of the plunger 34, which functions as a pressurizing member, and stops the flow of fuel between the high pressure pump 26 and the low pressure fuel path 42. As a result, pressure pulsation of the low pressure fuel is eliminated. This prevents the amount of fuel injected from the intake ports during the intake port injection mode from differing between cylinders.

It should be apparent to those skilled in the art that the present invention may be embodied in many other specific forms without departing from the spirit or scope of the invention. Particularly, it should be understood that the present invention may be embodied in the following forms.

Figure 23:
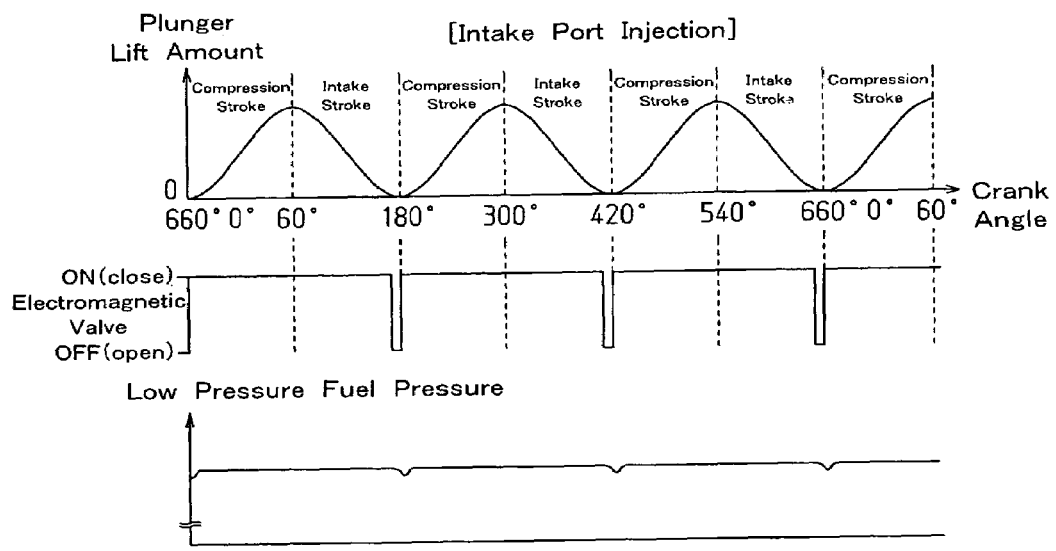
FIG. 23 is a timing chart illustrating control of an electromagnetic valve in a modification.

(a) In the above embodiments, the flow of fuel between the high pressure pump and the low pressure fuel path is completely stopped during the intake port injection mode. However, there may be a slight flow of fuel as long as the amount of injected fuel does not differ between cylinders. For example, in the second embodiment, the electromagnetic valve is closed during the intake port injection mode as illustrated in FIG. 7. However, the electromagnetic valve may be open for a short length of time in the intake stroke as illustrated in FIG. 23. In this case, during the intake port injection mode, the decrease in the ratio of the time the electromagnetic valve is open would restrict the flow of fuel between the high pressure pump and the low pressure fuel path.

As a result, decrease in the pressure of the low pressure fuel would occur only within a short period of time and would thus be small. Thus, differences in the fuel injection amount would not occur during intake port injection at a level that would cause a problem.

Figure 24:
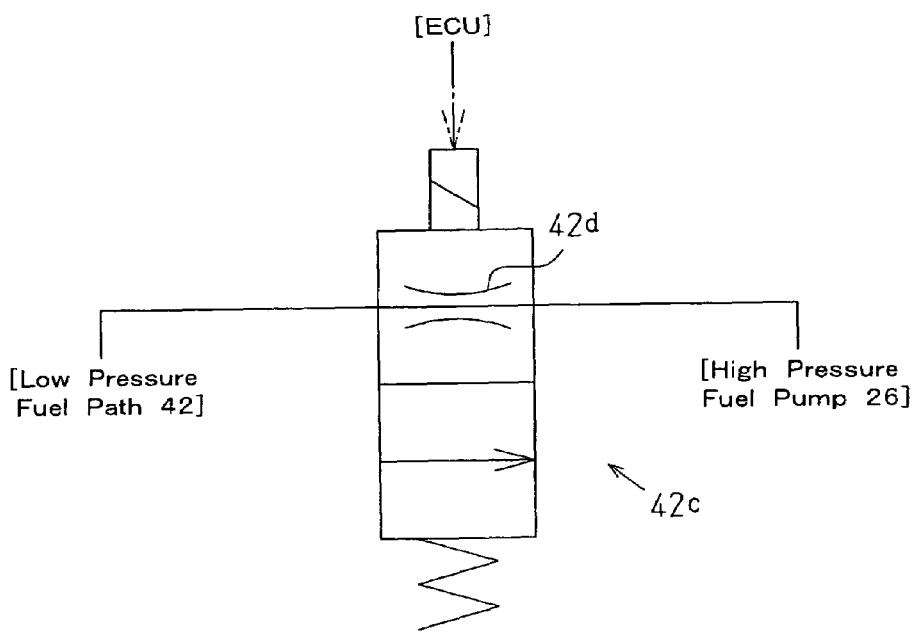
FIG. 24 is a schematic diagram of a switch valve in a modification.

Similarly, in the third embodiment, the electromagnetic shutting valve completely disconnects the high pressure pump and the low pressure fuel path during the intake port injection mode. However, a switch valve 42c, which is shown in FIG. 24, may be used in lieu of the electromagnetic shutting valve. The switch valve 42c restricts the flow of fuel through an orifice 42d between the high pressure pump and the low pressure fuel path during the intake port injection mode. This reduces the amplitude of the pressure pulsation in the low pressure fuel. Thus, differences in the fuel injection amount would not occur during intake port injection at a level that would cause a problem.

Figure 25:
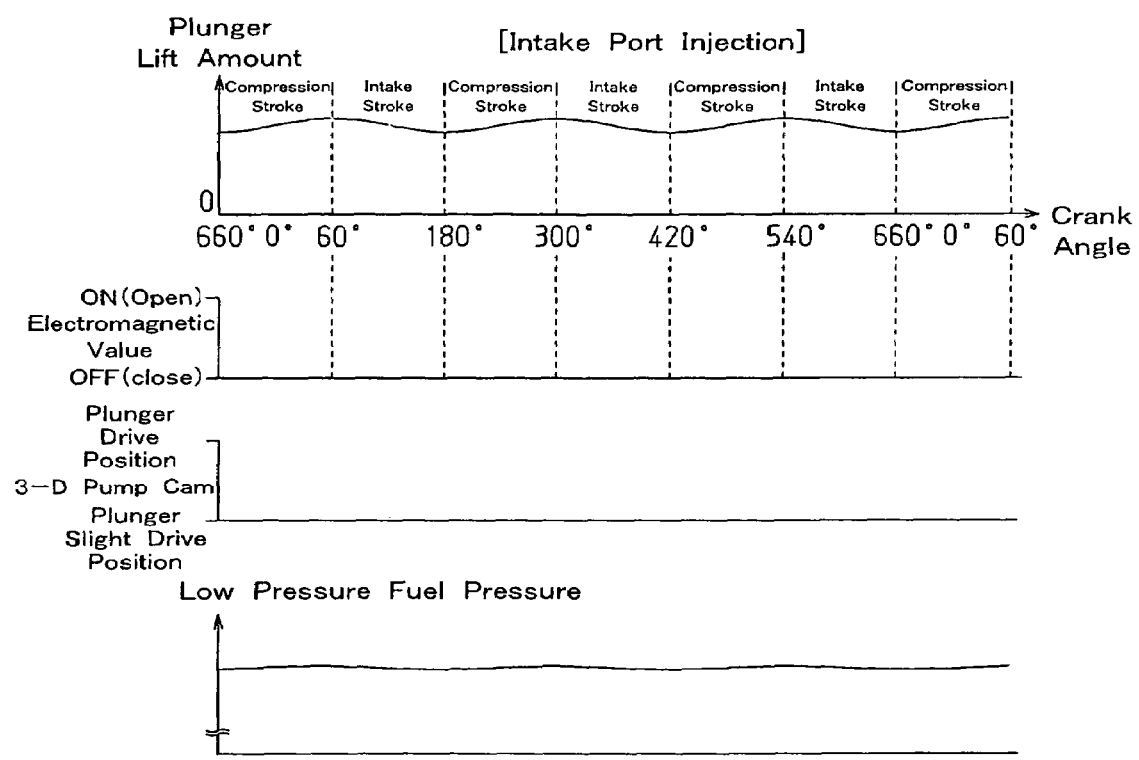
FIG. 25 is a timing chart illustrating control of an actuator in a modification.

Furthermore, in the fifth embodiment, the ball contacts the non-drive region in the intake port injection mode to completely stop reciprocation of the plunger. Instead, the ball may contact the drive region at a portion close to the non-drive region. More specifically, as shown in FIG. 25, the plunger may be slightly reciprocated during the intake port injection mode so that low pressure fuel is drawn in and out of the high pressure pump as long as the difference between cylinders in the fuel injection amount is subtle.

Figure 26A:
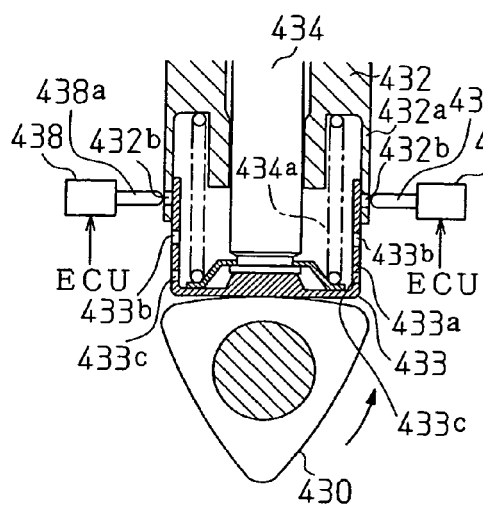
FIGS. 26A to 26D are schematic diagrams showing a mechanism for stopping reciprocation of a plunger during an intake port injection mode.

(b) In the fourth and fifth embodiments, the pump cam is controlled to stop the reciprocation of the plunger 34. However, the plunger may be directly stopped without using the pump cam. For example, the plunger 34 may be directly stopped as shown in FIGS. 26A to 26D. In FIG. 26A, a cylindrical wall 433a of a lifter 433 is guided by the inner surface of a lifter guide 432a extending from a cylinder 432. The lifter guide 432a and the cylindrical wall 433a respectively have two engaging holes 432b and 433b. Two electromagnetic solenoids 438 are arranged outside the lifter guide 432a respectively facing toward the two engaging holes 432b of the lifter guide 432a. In addition to the engaging holes 433b, the cylindrical wall 433a has an air release hole 433c.

In the state of FIG. 26A, the ECU does not supply the electromagnetic solenoids 438 with an excitation current during in-cylinder injection. Thus, a rod 438a of each electromagnetic solenoid 438 is not engaged with the corresponding engaging hole 432b. Therefore, rotation of the pump cam 430 reciprocates a plunger 434.

Figure 26B:
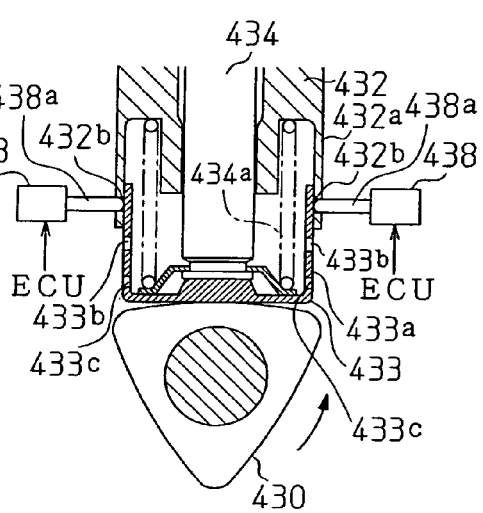
Figure 26C:
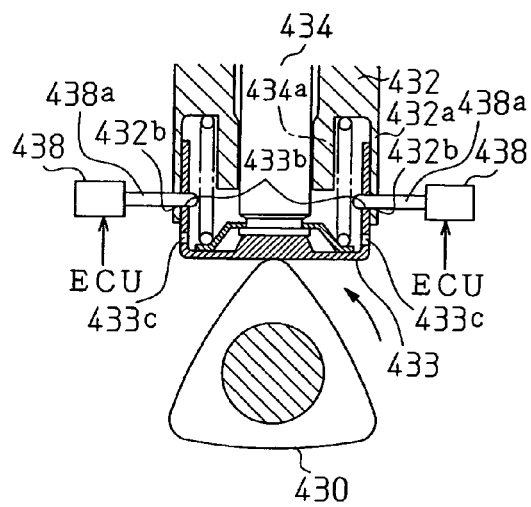
Figure 26D:
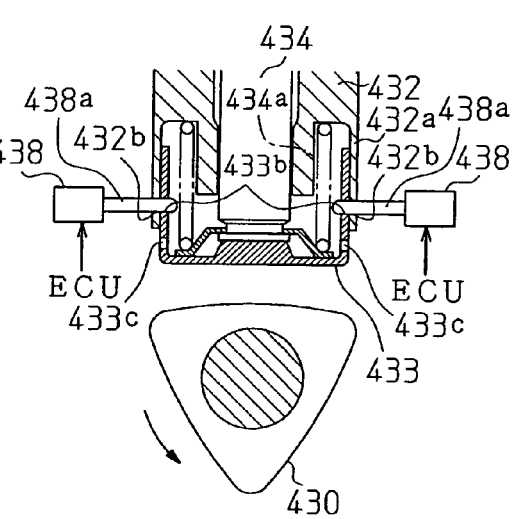

In the intake port injection mode, the ECU supplies the electromagnetic solenoid 438 with excitation current to insert the rods 438a in the engaging holes 432b. This state is shown in FIG. 26B. The engaging holes 432b of the lifter guide 432a and the engaging holes 433b of the cylindrical wall are formed to be in alignment when the plunger 434 is located at a maximum lift amount position. In the state of FIG. 26B, the lift amount of the plunger 434 is not maximum. Thus, the distal ends of the rods 438a, which are inserted in the engaging holes 432b of the lifter guide 432a, contact the surface of the cylindrical wall 433a. From this state, the pump cam 430 rotates and lifts the lifter 433 to the maximum lift amount position. As a result, the rods 438a become inserted in both engaging holes 432b and 433b as shown in the state of FIG. 26C. Thus, as shown in the state of FIG. 26D, when the pump cam 430 further rotates, the rods 438a and the engaging holes 43b and 433b continue to hold the cylinder 432 and the lifter 433 at a fixed position regardless of a spring 434a urging the lifter 433 downward. As a result, the plunger 434, which moves integrally with the lifter 433 stops reciprocating at the maximum lift position. This eliminates pressure pulsation of the low pressure fuel and prevents the amount of fuel injected from the injection ports from differing between cylinders.

When switching to in-cylinder injection, the ECU stops supplying the electromagnetic solenoid 438 with excitation current. Thus, a spring in each electromagnetic solenoid 438 returns the corresponding rod 438a to its original position, as shown in the state of FIG. 26A. Rotation of the pump cam 430 from this state starts reciprocation of the plunger 434.

(c) A two bank type engine is used in each of the above embodiments. However, the present invention may also be applied to an in-line type engine or an engine having three or more banks. Further, the number of cylinders is not limited to six, and there may be any number of cylinders.

The present examples and embodiments are to be considered as illustrative and not restrictive, and the invention is not to be limited to the details given herein, but may be modified within the scope and equivalence of the appended claims.

What is claimed is:

1. A fuel injector for an internal combustion engine including a cylinder and an intake port communicated with the cylinder, the fuel injector comprising:
   an intake port fuel injection valve for injecting fuel into the intake port;
   an in-cylinder fuel injection valve for directly injecting fuel into a combustion chamber of the cylinder;
   a low pressure fuel path for supplying the intake port fuel injection valve with fuel having relatively low pressure;
   a pump for pressurizing the fuel having relatively low pressure to supply the in-cylinder fuel injection valve with fuel having relatively high pressure; and
   a controller for controlling the intake port fuel injection valve and the in-cylinder fuel injection valve in accordance with an operating condition of the internal combustion engine,
   wherein the controller includes a flow restricting means for restricting fuel flow between the pump and the low pressure fuel path during an intake port injection mode in which only the intake port fuel injection valve injects fuel.

2. The fuel injector according to claim 1, further comprising:
   a low pressure fuel intake passage for connecting the pump and the low pressure fuel supply path;
   wherein the flow restricting means includes:
   a shutting valve for selectively closing the low pressure fuel intake passage;
   a shut controlling means for controlling the shutting valve, the shutting controlling means opening the shutting valve when the in-cylinder fuel injection valve is supplied with the fuel having relatively high pressure and the internal combustion engine is running, and the shutting controlling means closing the shutting valve in the intake port injection mode.

3. The fuel injector according to claim 1, wherein the pump includes an adjustment valve for adjusting the amount of the fuel having relatively low pressure that is drawn into the pump, and wherein the flow restricting means controls an open amount of the adjustment valve when the in-take fuel injection valve is supplied with the fuel having relatively high pressure and the internal combustion engine is running to adjust the amount of the relatively low pressure fuel that is pressurized by the pump and supplied to the in-cylinder fuel injection valve as the fuel having relatively high pressure, the ratio of time that the adjustment valve is open to when it is closed being decreased in the intake port injection mode.

4. The fuel injector according to claim 3, wherein the flow restricting means completely closes the adjustment valve in the intake port injection mode.

5. The fuel injector according to claim 1, wherein:
the pump includes a pressurizing chamber having a volume, and a pressurizing member for changing the volume of the pressurizing chamber when driven;
the pressurizing member changing the volume of the pressurizing member to draw the fuel having relatively low pressure into the pressurizing chamber, pressurize the fuel having relatively low pressure in the pressurizing chamber, and supply the in-cylinder fuel injection valve with the fuel having relatively high pressure that was pressurized; and
the flow restricting means suppressing change in the volume of the pressurizing chamber with the pressurizing member during the intake port injection mode.

6. The fuel injector according to claim 5, wherein the flow restricting means suppresses a drive amount of the pressurizing member during the intake port injection mode.

7. The fuel injector according to claim 6, wherein the flow restricting means stops driving the pressurizing member during the intake port injection mode.

8. A fuel injector for an internal combustion engine including a cylinder and an intake port communicated with the cylinder, the fuel injector comprising:
an intake port fuel injection valve for injecting fuel, into the intake port;
an in-cylinder fuel injection valve for directly injecting fuel into a combustion chamber of the cylinder;
a low pressure fuel path for supplying the intake port fuel injection valve with fuel having relatively low pressure;
a pump for pressurizing, the fuel having relatively low pressure to supply the in-cylinder fuel injection valve with fuel having relatively high pressure; and
a controller for controlling the intake port fuel injection valve and the in-cylinder fuel injection valve in accordance with an operating condition of the internal combustion engine,
wherein the controller executes a flow restricting process for restricting fuel flow between the pump and the low pressure fuel path during an intake port injection mode in which only the intake port fuel injection valve injects fuel.

9. The fuel injector according to claim 8, further comprising:
a low pressure fuel intake passage for connecting the pump and the low pressure fuel supply path; and
a shutting valve for selectively closing the low pressure fuel intake passage,
wherein the controller executes a shut controlling process for opening the shutting valve when the in-cylinder fuel injection valve is supplied with the fuel having relatively high pressure and the internal combustion engine is running, and for closing the shutting valve in the intake port injection mode.

10. The fuel injector according to claim 8, wherein the pump includes an adjustment valve for adjusting the amount of the fuel having relatively low pressure that is drawn into the pump, and wherein the controller controls an open amount of the adjustment valve when the in-take fuel injection valve is supplied with the fuel having relatively high pressure and the internal combustion engine is running to adjust the amount of the relatively low pressure fuel that is pressurized by the pump and supplied to the in-cylinder fuel injection valve as the fuel having relatively high pressure, the ratio of time that the adjustment valve is open to when it is closed being decreased in the intake port injection mode.

11. The fuel injector according to claim 10, wherein the controller completely closes the adjustment valve in the intake port injection mode.

12. The fuel injector according to claim 8, wherein:
the pump includes a pressurizing chamber having a volume, and a pressurizing member for changing the volume of the pressurizing chamber when driven;
the pressurizing member changing the volume of the pressurizing member to draw the fuel having relatively low pressure into the pressurizing chamber, pressurize the fuel having relatively low pressure in the pressurizing chamber, and supply the in-cylinder fuel injection valve with the fuel having relatively high pressure that was pressurized; and
the controller suppressing change in the volume of the pressurizing chamber with the pressurizing member during the intake port injection mode.

13. The fuel injector according to claim 12, wherein the controller suppresses a drive amount of the pressurizing member during the intake port injection mode.

14. The fuel injector according to claim 13, wherein the controller stops driving the pressurizing member during the intake port injection mode.

15. A method for supplying fuel to an internal combustion engine, wherein the internal combustion engine includes a cylinder, an intake port communicated with the cylinder, and a fuel injector, the fuel injector including:
an intake port fuel injection valve for injecting fuel into the intake port;
an in-cylinder fuel injection valve for directly injecting fuel into a combustion chamber of the cylinder;
a low pressure fuel path for supplying the intake port fuel injection valve with fuel having relatively low pressure; and
a pump for pressurizing the fuel having relatively low pressure to supply the in-cylinder fuel injection valve with fuel having relatively high pressure, the method comprising:
injecting fuel from at least one of the intake port fuel injection valve and the in-cylinder fuel injection valve; and
restricting fuel flow between the pump and the low pressure fuel path when only the intake port fuel injection valve injects fuel.

16. The method according to claim 15, wherein the internal combustion engine further includes a low pressure fuel intake passage for connecting the pump and the low pressure fuel supply path, and wherein said restricting fuel flow includes:
opening the low pressure fuel supply path when the in-cylinder fuel injection valve is supplied with the fuel having relatively high pressure and the internal combustion engine is running; and
closing the low pressure fuel supply path when only the intake port fuel injection valve injects fuel.

17. The method according to claim 15, wherein the pump includes an adjustment valve for adjusting the amount of the fuel having relatively low pressure that is drawn into the pump, and wherein said restricting fuel flow includes:

controlling an open amount of the adjustment valve when the in-take fuel injection valve is supplied with the fuel having relatively high pressure and the internal combustion engine is running to adjust the amount of the relatively low pressure fuel pressurized by the pump and supplied to the in-cylinder fuel injection valve as the fuel having relatively high pressure; and decreasing the ratio of time that the adjustment valve is open to when it is closed when only the intake port fuel injection valve injects fuel.

18. The method according to claim 17, wherein said restricting fuel flow includes completely closing the adjustment valve when only the intake port fuel injection valve injects fuel.

19. The method according to claim 15, wherein:

the pump includes a pressurizing chamber having a volume, and a pressurizing member for changing the volume of the pressurizing chamber when driven, the pressurizing member changing the volume of the pressurizing member to draw the fuel having relatively low pressure into the pressurizing chamber, pressurize the fuel having relatively low pressure in the pressurizing chamber, and supply the in-cylinder fuel injection valve with the fuel having relatively high pressure that was pressurized; and said restricting fuel flow includes suppressing change in the volume of the pressurizing chamber with the pressurizing member when only the intake port fuel injection valve injects fuel.

20. The method according to claim 19, wherein said restricting fuel flow includes suppressing a drive amount of the pressurizing member when only the intake port fuel injection valve injects fuel.

21. The method according to claim 20, wherein said restricting fuel flow includes stopping the driving of the pressurizing member when only the intake port fuel injection valve injects fuel.

* * * * *